United States Patent
Zaps

(10) Patent No.: US 8,040,015 B2
(45) Date of Patent: Oct. 18, 2011

(54) ROTOR FOR AN ELECTRIC MOTOR

(75) Inventor: Klaus Zaps, Volkach (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 69 days.

(21) Appl. No.: 12/310,121

(22) PCT Filed: Jul. 26, 2007

(86) PCT No.: PCT/EP2007/057724
§ 371 (c)(1), (2), (4) Date: Jul. 16, 2009

(87) PCT Pub. No.: WO2008/019932
PCT Pub. Date: Feb. 21, 2008

(65) Prior Publication Data
US 2010/0045132 A1    Feb. 25, 2010

(30) Foreign Application Priority Data
Aug. 14, 2006 (DE) .......... 10 2006 038 017

(51) Int. Cl.
H02K 1/28 (2006.01)
H02K 15/03 (2006.01)
H02K 1/30 (2006.01)

(52) U.S. Cl. .......... 310/216.137; 310/45; 310/156.21; 310/216.004; 310/216.015; 310/216.065; 29/598

(58) Field of Classification Search .......... 29/598, 29/609; 310/156.21, 216.004, 216.015, 216.137, 310/216.113, 216.065
See application file for complete search history.

(56) References Cited

U.S. PATENT DOCUMENTS

| | | | | |
|---|---|---|---|---|
| 3,655,482 A | * | 4/1972 | Schildkraut et al. | 156/276 |
| 5,232,962 A | * | 8/1993 | Dershem et al. | 523/442 |
| 5,898,990 A | * | 5/1999 | Henry | 29/598 |
| 6,141,856 A | * | 11/2000 | Johnson et al. | 29/598 |
| 6,548,925 B2 | | 4/2003 | Noble et al. | |
| 6,806,309 B2 | * | 10/2004 | Jaeger | 524/548 |
| 7,372,181 B2 | * | 5/2008 | Kinashi et al. | 310/156.13 |
| 2004/0088852 A1 | * | 5/2004 | Ogawa et al. | 29/598 |

FOREIGN PATENT DOCUMENTS

| | | |
|---|---|---|
| DE | 4331787 A1 | 4/1994 |
| DE | 10110660 A1 | 5/2002 |
| DE | 10314394 A1 | 10/2004 |
| JP | 2002204540 A | 7/2002 |
| WO | 03072673 A2 | 9/2003 |
| WO | WO 03/105312 A1 | 12/2003 |

OTHER PUBLICATIONS

DE Office Action in Corresponding 102006038017.7-32 dated May 25, 2007.
ISR & Written Opinion in PCTEP2007/057724 dated Dec. 20, 2007.

* cited by examiner

*Primary Examiner* — Burton Mullins
(74) *Attorney, Agent, or Firm* — Manelli Selter PLLC; Edward J. Stemberger

(57) ABSTRACT

The invention relates to a rotor for an electric motor, comprising a rotor shaft, a rotor core stack that is attached to the rotor shaft, a ring member which surrounds the rotor core stack, and a gap located between the rotor core stack and the ring member. Adhesive is introduced into the gap for fastening the ring member to the rotor core stack. Molded articles that are used as spacers are admixed to the adhesive.

9 Claims, 2 Drawing Sheets

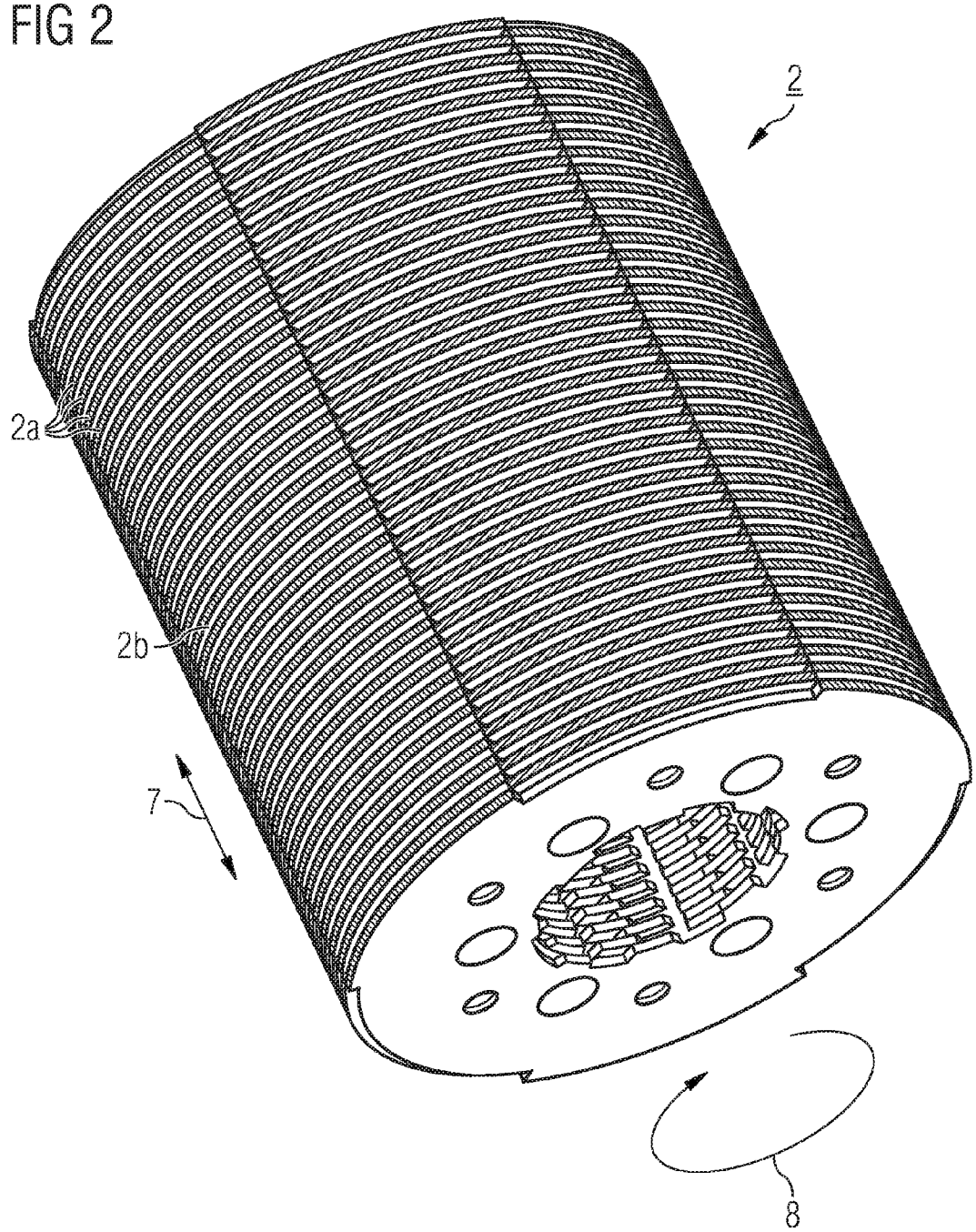

ROTOR FOR AN ELECTRIC MOTOR

FIELD OF THE INVENTION

The invention relates to a rotor for an electric motor, which rotor has a rotor shaft, a laminated rotor core which is fixed on the rotor shaft, an annular body which surrounds the laminated rotor core, and a gap which is provided between the laminated rotor core and the annular body and in which adhesive is inserted in order to fix the annular body to the laminated rotor core.

BACKGROUND OF THE INVENTION

Brushless DC motors in which permanent magnets are located on the rotor surface are already known. These permanent magnets are usually produced as ring magnets. When such permanent magnets are arranged on the rotor surface, a return path body which is firmly connected to the rotor shaft is provided between the rotor shaft and the permanent magnets. The annular permanent magnets are adhesively bonded to this return path body so that a torque can be transmitted to the rotor shaft via the return path body. The width of the adhesive gap between the ring magnet and the return path body has to comply with an upper and lower limit in order to provide optimum adhesive bonding. This adhesive bonding should be performed in such a way that the ring magnet sits centrally, in order to prevent any imbalance. To this end, a complicated adhesive bonding apparatus is usually provided which is to be fitted with the components to be adhesively bonded.

DE 103 14 394 A1 discloses a rotor for a brushless DC motor and a method for mounting a rotor of this type. This known rotor has a shaft, a return path body which is arranged on the shaft, and a ring magnet which surrounds the return path body. A gap is formed in the axially running region between the return path body and the ring magnet. Furthermore, a retaining element is provided which, outside the gap, is connected at one end to the shaft or to the return path body and at the other end to the ring magnet. This retaining element connects the ring magnet to the shaft or to the return path body in a force-fitting manner and additionally centers said ring magnet with respect to the shaft or the return path body. Furthermore, a casing which surrounds the ring magnet is preferably provided. The retaining element and the casing are integrally formed as a sleeve, with the ring magnet being connected to the sleeve in a force-fitting manner by being pressed into said sleeve. In the case of this known rotor, the ring magnet is arranged centrally with respect to the rotor shaft or the return path body, without adhesive bonding being required.

SUMMARY OF THE INVENTION

The object of the invention is to further develop a rotor for an electric rotor in such a way that the coaxiality of the annular body is ensured in a simplified manner.

According to the present invention, shaped bodies which serve as spacers are admixed with the adhesive which is inserted into the gap which is provided between the laminated rotor core and the annular body. These shaped bodies which are admixed with the adhesive ensure that there is an adhesive gap with uniform dimensions in the region of the entire casing surface of the laminated rotor core. Said shaped bodies, which are preferably of spherical design, ensure that the annular body is centered with respect to the rotor shaft. Said shaped bodies comprise a dimensionally stable, electrically non-conductive material, and so the electrical properties of the rotor and therefore of the entire electric motor are not influenced in an undesirable manner.

The casing surface of the laminated rotor core is preferably provided with elevations and recesses. This can be achieved in a simple manner by the laminated rotor core being composed of a large number of individual laminations which are axially linked to a neighboring lamination in a manner rotated through 60° in each case and are in each case provided on their casing surface with elevations and recesses which alternate at a distance of 60° in the circumferential direction. Individual laminations of this type can be produced in a simple manner by means of a stamping process.

Small beads of different diameters are preferably admixed with the adhesive. These diameters are selected such that a maximum and a minimum adhesive gap can be complied with. Beads whose diameters are too large for the respectively existing adhesive gap settle in the recesses in the casing surface of the laminated rotor core, whereas the other beads ensure the desired centering and coaxiality of the annular body.

BRIEF DESCRIPTION OF THE DRAWINGS

Further advantageous properties of the invention can be found in the following exemplary explanation with reference to the figures, in which FIG. 2 shows a perspective view of the laminated rotor core of the rotor illustrated in FIG. 1.

DESCRIPTION OF THE PREFERRED EMBODIMENTS

Figure 1:
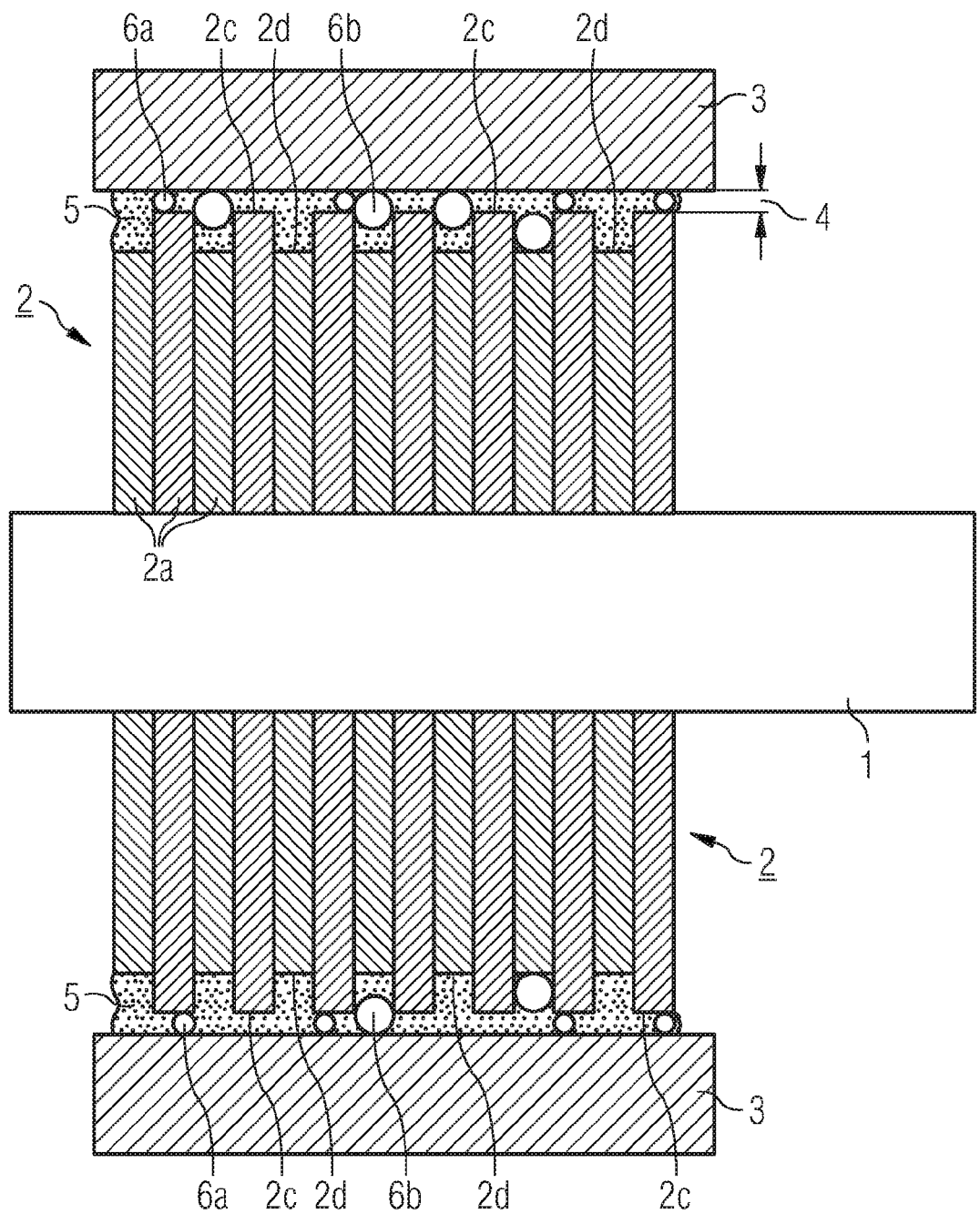
FIG. 1 shows a schematic illustration of a longitudinal section through a rotor according to the invention.

FIG. 1 shows a schematic illustration of a longitudinal section through a rotor according to the invention. This rotor has a rotor shaft 1 on which a laminated rotor core 2 is fixed. This laminated rotor core is composed of a large number of individual laminations 2a. The casing surface of the laminated rotor core has elevations 2c and recesses 2d. The laminated rotor core is surrounded by an annular body 3. A gap 4 is located between the laminated rotor core 2 and the annular body 3. Adhesive 5 is inserted into this gap 4 in order to fix the annular body 3 to the laminated rotor core.

According to the present invention, shaped bodies 6a, 6b which serve as spacers are admixed with the adhesive. These shaped bodies ensure that a desired minimum distance is always present between the laminated rotor core 2 and the annular body 3. Furthermore, these shaped bodies ensure the desired centricity or coaxiality of the annular body with respect to the rotor shaft.

In order to adhesively bond the laminated rotor core 2, which is firmly connected to the rotor shaft 1, to the annular body 3, the adhesive 5, with which the beads 6a and 6b are admixed, is initially applied to the casing surface of the laminated rotor core in a first step. In a second step, the annular body 3 is slipped onto the laminated rotor core, which is provided with adhesive, in the axial direction, possibly with simultaneous rotation. During this slipping-on process, the beads 6b, whose diameters are too large for the existing adhesive gap 4, are pushed into the recesses 2d in the casing surface of the laminated rotor core, as is illustrated in FIG. 1. A sufficient number of the beads 6a with the smaller diameter remain between the elevations 2c of the casing surface and the annular body during this slipping-on process, as a result of which the desired distance between the annular body and the laminated rotor core is set and the desired centricity or coaxiality of the annular body relative to the rotor shaft is ensured.

The shaped bodies 6a and 6b are preferably small beads comprising a dimensionally stable, electrically non-conductive material, for example comprising glass or comprising plastic. This ensures that the electrical properties of the rotor and therefore of the entire electric motor are not influenced in an undesirable manner.

A laminated rotor core 2, as is shown in FIG. 1, can be produced in a simple manner at a similar cost to laminated rotor cores which have been used to date. As shown by the perspective view according to FIG. 2, the laminated rotor core comprises a large number of individual laminations 2a which are in each case formed by means of a stamping process. The casing surface 2b of the laminated rotor core 2 has elevations and recesses which alternate both in the axial direction 7 and in the circumferential direction 8. To this end, each individual lamination is provided with six linkage points by means of which the individual lamination can be connected to a neighboring lamination. Each individual lamination has, on its casing surface, elevations and recesses which alternate at a distance of 60° in the circumferential direction. Adjacent individual laminations are fixed to one another in a manner rotated through 60° in relation to one another in each case. This has the overall result that the casing surface of the laminated rotor core, as can be seen from FIG. 2, has the desired elevations and recesses, which correspond to corrugation of the casing surface of the laminated rotor core, which alternate both in the axial direction 7 and in the circumferential direction 8.

According to the present invention, a rotationally symmetrical adhesive gap is provided after all this, said adhesive gap ensuring coaxial adhesive bonding of the annular body 3 on the casing surface of the laminated rotor core 2. There is no need to provide for complicated mechanical construction of an auxiliary adhesive device which is required in the prior art in order to seat the annular body centrally.

Furthermore, the described corrugation of the casing surface of the laminated rotor core improves the strength of the adhesive bonding. Deviations in rotation of the rotor are reduced.

The corrugation of the casing surface of the laminated rotor core permits centering in the entire adhesive gap tolerance field since the beads which are too large for the adhesive gap which is established settle in the recesses in the casing surface. A further result is that a defined quantity of adhesive is stored in the recesses or in the corrugation. The result of this is that the entire adhesive surface is wetted with adhesive, and this improves the adhesive bonding process overall.

The invention claimed is:

1. A rotor for an electric motor, having
a rotor shaft,
a laminated rotor core which is fixed on the rotor shaft,
an annular body which surrounds the laminated rotor core,
a gap which is provided between the laminated rotor core and the annular body and in which adhesive is inserted in order to fix the annular body to the laminated rotor core,
wherein shaped bodies which serve as spacers are admixed with the adhesive, the shaped bodies being of different dimensions,
wherein the outer surface of the laminated rotor core has elevations and recesses, and
wherein the shaped bodies with the larger dimensions are positioned in the recesses in the outer surface of the laminated rotor core.

2. The rotor as claimed in claim 1, wherein the shaped bodies of all dimensions are of spherical design.

3. The rotor as claimed in claim 1, wherein the shaped bodies comprise a dimensionally stable, electrically non-conductive material.

4. The rotor as claimed in claim 3, wherein the shaped bodies comprise glass or plastic.

5. A rotor for an electric motor, having
a rotor shaft,
a laminated rotor core which is fixed on the rotor shaft,
an annular body which surrounds the laminated rotor core,
a gap which is provided between the laminated rotor core and the annular body and in which adhesive is inserted in order to fix the annular body to the laminated rotor core
wherein shaped bodies which serve as spacers are admixed with the adhesive, wherein an outer surface of the laminated rotor core has alternating elevations and recesses in the circumferential direction and in the axial direction, and
wherein the laminated rotor core is composed of a large number of individual laminations, the individual laminations are in each case provided with linkage points by means of which each individual lamination is axially linked to a neighboring lamination in a manner rotated through 60° in relation to a neighboring lamination, and each individual lamination has on its outer surface elevations and recesses which alternate at a distance of 60° in the circumferential direction.

6. The rotor as claimed in claim 5, wherein the shaped bodies of different dimensions are admixed with the adhesive, and wherein the shaped bodies with the larger dimensions are positioned in the recesses in the outer surface of the laminated rotor core.

7. The rotor as claimed in claim 6, wherein the shaped bodies of all dimensions are of spherical design.

8. A rotor for an electric motor, having
a rotor shaft,
a laminated rotor core which is fixed on the rotor shaft,
an annular body which surrounds the laminated rotor core,
a gap which is provided between the laminated rotor core and the annular body and in which adhesive is inserted in order to fix the annular body to the laminated rotor core,
wherein shaped bodies which serve as spacers are admixed with the adhesive,
wherein the outer surface of the laminated rotor core has alternating elevations and recesses in the circumferential direction and in the axial direction, and
wherein the shaped bodies with the larger dimensions are positioned in the recesses in the outer surface of the laminated rotor core.

9. The rotor as claimed in claim 8, wherein the shaped bodies of all dimensions are of spherical design.

* * * * *